United States Patent [19]

Kauffman et al.

[11] E Patent Number: Re. 33,037

[45] Reissued Date of Patent: Aug. 29, 1989

[54] FENCELINER

[76] Inventors: Lawrence R. Kauffman, Rte. 10, Box 101; Kenneth L. Kauffman, Lot 26, Horizon La., both of Gadsden, Ala. 35901

[21] Appl. No.: 145,157

[22] Filed: Jan. 19, 1988

Related U.S. Patent Documents

Reissue of:

[64] Patent No.: 4,595,175
Issued: Jun. 17, 1986
Appl. No.: 718,971
Filed: Apr. 2, 1985

[51] Int. Cl.[4] ..... E04H 17/06

[52] U.S. Cl. ..... 256/1; 256/32

[58] Field of Search ..... 256/1, 32; 52/102, 716

[56] References Cited

U.S. PATENT DOCUMENTS

| | | | |
|---|---|---|---|
| 3,384,351 | 5/1968 | Turner, Jr. | 256/32 |
| 3,393,897 | 7/1968 | Wright | 256/32 |
| 3,515,373 | 6/1970 | Abbe | 256/32 |
| 3,704,004 | 11/1972 | Carter, Jr. | 256/1 |
| 3,713,624 | 1/1973 | Niemann | 256/1 |
| 3,768,780 | 10/1973 | Cowles | 256/1 |
| 3,803,760 | 4/1974 | Matvey | 52/102 X |
| 3,806,096 | 4/1974 | Eccleston et al. | 52/102 |
| 3,822,864 | 7/1974 | Keys | 256/1 X |
| 3,868,804 | 3/1975 | Tautlinger | 52/716 X |
| 4,321,769 | 3/1982 | Tisbo et al. | 52/716 |
| 4,349,989 | 9/1982 | Snider | 256/32 X |

*Primary Examiner*—Andrew V. Kundrat
*Attorney, Agent, or Firm*—Antonelli, Terry & Wands

[57] ABSTRACT

A fenceliner for inhibiting growth of grass, weeds and other vegetation beneath and closely adjacent a fence so as to make cutting or trimming of such vegetation unnecessary, and for inhibiting passage of small animals across the border defined by the fence. The fenceliner can be provided as a coiled strip of thin flexible material such as plastic or metal. The thin material is uncoiled and rolled out along the length of the fence and is cut to fit around fence posts. Preferably the material is colored to closely simulate the coloring of the surrounding vegetation. A centrally located longitudinal recess in the strip receives the bottom of the fence panels. Symmetric legs extend outwardly and downwardly from the recess to cover the ground closely adjacent to the fence. The legs have sufficient spring tension to bias the recess against the bottom of the fence panels when the fenceliner is in position on the ground beneath the fence.

10 Claims, 2 Drawing Sheets

FIG. 1
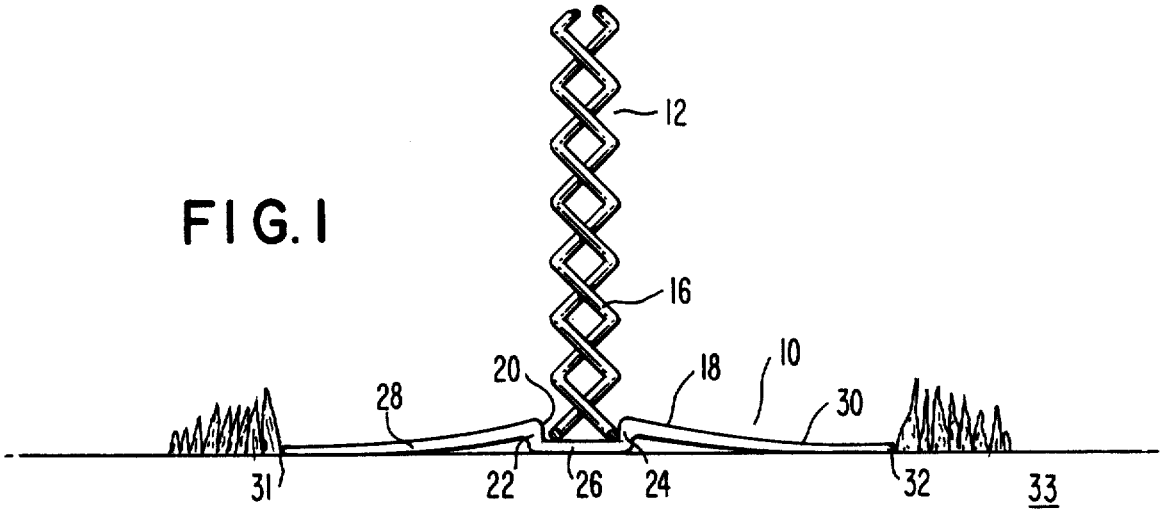
FIG. 2
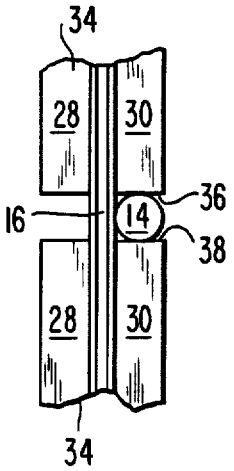
FIG. 3
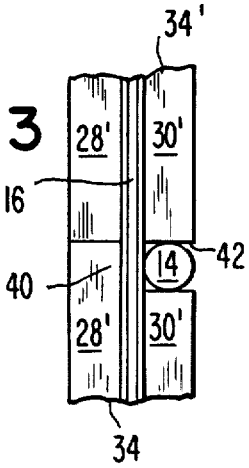
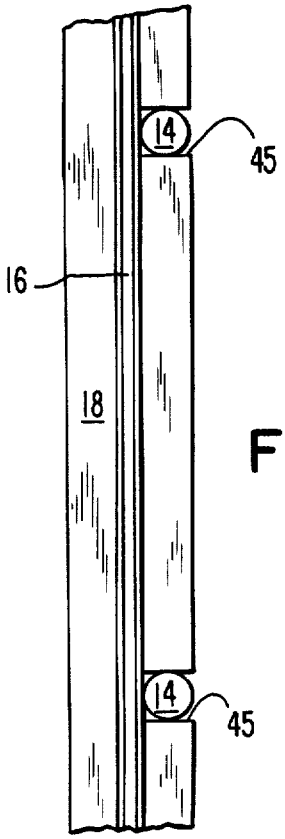
FIG. 4
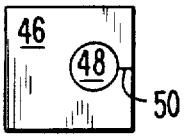
FIG. 6

FENCELINER

Matter enclosed in heavy brackets [ ] appears in the original patent but forms no part of this reissue specification; matter printed in italics indicates the additions made by reissue.

BACKGROUND OF THE INVENTION

The present invention pertains to a fenceliner for retarding or preventing the growth of grass, weeds or like vegetation below or along the sides of a fence. More particularly, the present invention pertains to a fenceliner, preventing the growth of vegetation around a fence, which fenceliner can be installed with a minimum of effort and a minimum number of tools under an existing fence or under a fence as the fence is being installed. The fenceliner also inhibits small animals from crawling or burrowing under the fence.

After erection or placement of a fence, the strips of ground immediately beneath and closely adjacent to the opposite sides of the fence are inaccessible to conventional lawn mowers, making it necessary to trim such areas by hand or with a trimmer tool or to leave such areas uncut. U.S. Pat. No. 3,515,373 discloses a fence trim guard and points out that any vegetation growing in the areas underneath or adjacent to the fence must be trimmed by hand. The fence trim guard of that patent has a plurality of paired, telescopically interlocking guard members adapted to overlie the ground underneath the fence, between the fence posts. Installation of each guard member requires digging under the fence to embed each of a pair of outwardly extending lateral flanges underneath the ground to anchor the trim guard.

From U.S. Pat. No. 3,384,351 it is also known to construct a grass guard device having inherent spring tension for biasing the fence guard upwardly against the wire paneling of the fence. This grass guard, however, is designed for installation along the fence line before the fence is completely erected to ensure that the spacing between the fence posts substantially corresponds to the spacing between the slots through the grass guard.

U.S. Pat. No. 4,349,989 discloses a fence guard having an elongated fence guard with an elongated slot in the middle to receive the bottom of the fence. The fence guard is assembled during construction of the fence such that the cooperating swivel joints and corner post plates, provided to maintain the continuity of the fence guard receive the fence posts prior to application of the fence panel. The various types and the complexity of the joints and plates results in a fence guard that is difficult to install and expensive to manufacture.

SUMMARY OF THE INVENTION

The present invention relates to a fenceliner for retarding or preventing the growth of grass, weeds or the like underneath or closely adjacent to a fence, which fenceliner can be readily installed under an existing fence, or as a new fence is being installed, with a minimum of effort and a minimum number of tools. Additionally, the fenceliner inhibits small animals from either crawling or burrowing under the fence.

The fenceliner of the present invention can conveniently be provided as a coiled strip which is rolled out or uncoiled along the length of the fence and cut to fit around the fence posts. The coiled strip is formed of flexible sheet material which can be cut into segments of any desired length with a simple cutting tool. The coiled material is preferably of a color closely simulating that of the surrounding lawn and thus is opaque to solar light. Any conventional lawn mower can be used to cut grass or other vegetation growing adjacent to the fenceliner by simply mowing over the edge of the fenceliner.

A centrally located recess extends longitudinally for the entire length of the fenceliner to receive the panel of the fence. In integral connection with opposite sides of the recess, symmetric leg portions extend outwardly and downwardly from the recess and the fence panel. Each leg gradually narrows from a relatively thick portion adjacent the recess to terminate in a slender portion below the base of the recess. The symmetric legs are characterized by inherent spring tension when the recess is depressed to the ground by the weight of the fence panel.

Pad members are provided to maintain the continuity of the fenceliner at the spaced apart fence posts. A fence post engages a hole, accommodating the post, through each pad member by means of a slit through one side of the pad member. As the hole closely approximates the contours of the post, the pad member fits flushly around the post. Each pad member has a width approximately equalling the width of the coiled strip and a longitudinal length permitting portions of each pad member to underlie the fenceliner strips abutting the post.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals:

FIG. 1 is a fragmentary vertical cross-sectional view, depicting a fenceliner in accordance with a preferred embodiment of the present invention combination with a fence;

FIG. 2 is a fragmentary top plan view of the fence and fence liner depicted in FIG. 1 in which the ends of segments cut from a continuous strip of flexible sheet material comprising the fenceliner are shown as abutting a fence post;

FIG. 3 is a view similar to FIG. 2 showing another arrangement of the invention;

FIG. 4 is another view similar to FIG. 3 depicting the fenceliner as one continuous strip underneath the fence with cutouts provided for the fence posts;

FIG. 6 is a top view of a pad member suitable for use around a fence post in accordance with the present invention;

DESCRIPTION OF PREFERRED EMBODIMENTS

Figure 5:
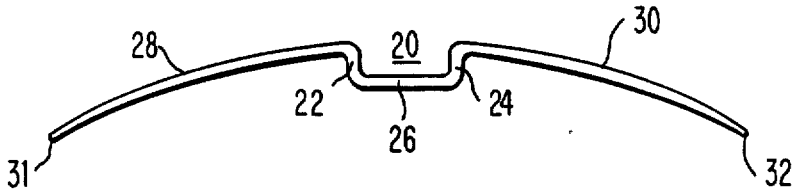
FIG. 5 is a vertical, cross-sectional view of a fenceliner in accordance with the present invention before installation under a fence.

FIG. 1 shows in cross-sectional view a fenceliner 10, in accordance with the present invention, in combination with a fence 12. Fence 12 represents a portion of a conventional fence and is illustratively depicted as being of the chain link type; however, fenceliner 10 can be made to accommodate any type of conventional fence. Fence 12 includes spaced-apart posts 14, shown in FIGS. 2 through 4, and paneling 16 which is secured to one side of posts 14 in the usual manner and, in the illustrative showing of FIG. 1, is depicted as open weave wire paneling forming a chain link fence.

Fenceliner 10 comprises a strip 18 of flexible sheet material, coextensive with the length of the fence 12, strip 18 being arranged longitudinally of fence 12 and beneath it. The material of strip 18, in addition to being flexible, is preferably of a dark color such as green to absorb solar light and thereby prevent transmission of such through strip 18. In the form of a strip 18, fenceliner 10 is preferably rolled for storage, portions of such roll being unwound and severed as needed to produce a segment of any desired length.

In the embodiment of FIG. 5, a recess 20 traverses the longitudinal center of strip 18 and is provided with two upstanding side walls 22 and 24 which are spaced-apart by base portion 26. Symmetric legs 28 and 30 extend outwardly and downwardly away from side walls 22 and 24 along an arcuate path to terminate at terminal ends 31 and 32, just below base portion 26. Symmetric legs 28 and 30 gradually narrow from their thickest portions at side walls 22 and 24 to their thinnest portions at ends 31 and 32. Thus when fenceliner 10 is constructed from thin flexible metal, plastic, rubber or like material having resilient properties, the arcuate form of legs 28, 30 is characterized by an inherent spring tension.

Symmetric legs 28, 30 and 28', 30' are shown respectively in FIGS. 2, 3 and 4 as well as in FIG. 1, to be relatively wider than fence 12 and to extend symmetrically outward laterally from fence paneling 16. As seen from the cross-sectional view of FIG. 1, when installed beneath a fence 12, fenceliner 10 is flexed downwardly by paneling 16. In this position base portion 26 is close to or rests upon the ground 33, and the inherent spring tension of legs 28 and 30 upwardly biases recess 20 against paneling 16. Thus, fenceliner 10 can readily be installed under an existing length of fence by simply depressing fenceliner 10, as by applying hand pressure to recess 20, and sliding fenceliner 10 under the fence. Alternatively, fence 12 could be erected over a previously positioned fenceliner 10.

As seen from FIGS. 2 through 4, segments 34 of fenceliner 10 may be cut from continuous strip 18, with lengths closely approximating the spacing between any two posts 14 of fence 12. In the arrangement of FIG. 2, ends 36 and 38 of adjacent segments 34 abut opposite sides of post 14. Alternatively, as shown in FIG. 3, segment end 40 has a notch 42 cut from it, permitting adjacent leg portions 28' to abut each other while leg portions 30' of segment 34 abut opposite sides of post 14.

In FIG. 4, the continuous strip 18 is shown as having cutouts 45 corresponding to the spaced relation between posts 14 rather than being cut into segments.

To provide continuity at post 14, a plurality of pad members 46, as shown by FIG 6, are configured to fit flushly around fence posts 14 and to extend outwardly therefrom. Fence segments 34, extending between and abutting any two fence posts 14, overlie pad member 46 so that the ground is substantially covered up to post 14. Pad members 46 can be of any desired dimensions to accommodate the configurations of any of FIGS. 2 through 4. Each pad member 46 is provided with hole 48 to receive a fence post therethrough, and a slit 50, through which post 14 passes to be received within hole 48.

Fenceliner 10 can be installed under an existing fence 12 by first determining the spacing between adjacent posts 14 and then cutting a segment 34 of strip material 18 to correspond with that spacing. Strip material 18 may be, for example, simply rolled out between two posts 14 and cut at points corresponding to the posts with a tool appropriate for cutting the material 18, such as heavy scissors if material 18 is a light flexible plastic. The cut segment 34 is then depressed, for example by hand, at recess 20 and slid under fence 12 until recess 20 lies directly under fence panel 16. Pressure is removed, and the spring bias in legs 28 and 30 urges fenceliner 10 upward until base portion 26 firmly contacts fence panel 16. In the preferred arrangement, the distance between fence panel 16 and the ground 33 is insufficient for fenceliner 10 to assume its fully unflexed form, shown in FIG. 4, so that symmetric legs 28 and 30 continue to bias fenceliner 10 against panel 16 after pressure is withdrawn.

Downward depression of fenceliner 10 by fence 12 thus urges fenceliner 10 to forceably cover over any undesired vegetation growing thereunder. In this way fenceliner 10 prevents the growth of undesired vegetation in the vicinity of fence 12 by crushing down the vegetation and isolating such from direct receipt of rainfall. Further, as fenceliner 10 comprises dark and opaque strip material, the undesired vegetation is further isolated from both solar light and heat to quickly dispose of the vegetation. The flexible nature of strip material 18, however, permits mowing of all vegetation bordering fenceliner 10 with any conventional lawn mower by mowing directly over the fenceliner.

Fenceliner 10 also inhibits small animals from crossing the border defined by fence 12. Such animals are inhibited from crawling between fenceliner 10 and fence 12 by the spring tension in legs 28 and 30 biasing base portion 26 against panel 16. Further, that greatly increased width of the fence base as defined by the width of symmetric legs 28 and 30 discourages such animals from burrowing underneath fence 12.

Installation of a fenceliner 10 with pad members 46 is identical to the installation described hereinabove, preceded by the fitting of a pad member 46 around each post 14. Slit 50 permits centering the pad member 46 about post 14 at hole 48.

Figure 7:
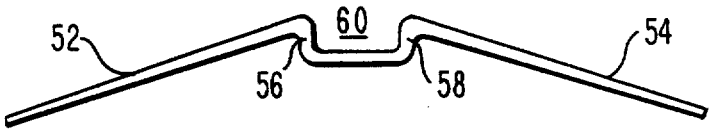
FIG. 7 is a vertical, cross-sectional view similar to FIG. 6, showing another form of a fenceliner in accordance with the present invention.

FIG. 7 is a cross-sectional view of a second embodiment of a fenceliner, similar to that of FIG. 6 but having legs 52 and 54 straight rather than arcuate. Legs 52 and 54 are formed to extend downwardly and outwardly from side walls 56 and 58 of recess 60 at an angle slightly less than 90° to provide upwardly biasing spring tension in the fenceliner.

Figure 8:
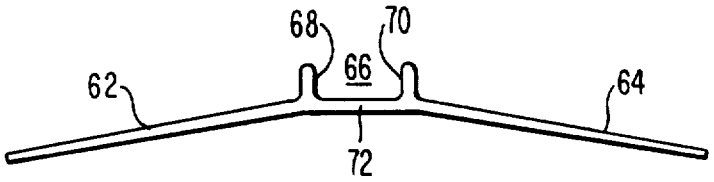
FIG. 8 is a view similar to FIG. 6 showing still another form of a fenceliner in accordance with the present invention.

FIG. 8 is a cross-sectional view of still another embodiment of a fenceliner in accordance with the present invention. Like the fenceliner of FIG. 7, the fenceliner of FIG. 8 includes straight symmetrical legs 62 and 64 characterized by inherent spring tension. A longitudinal recess 66 is defined between longitudinally-extending, upstanding walls 68 and 70, which are spaced apart by base portion 72. Recess 66 likewise receives fence panel 16. Legs 62 and 64 extend downwardly and outwardly from the vertical planes defined by upstanding walls 68 and 70 at an angle of slightly less than 90°.

Although the present invention has been described with reference to preferred embodiments, rearrangements and modifications may be made by one skilled in the art within the scope of the invention.

What is claimed is:

1. A fenceliner for inhibiting the growth of grass, weeds or like vegetation beneath and closely adjacent to a fence having a plurality of posts and at least one fence panel, and for inhibiting the passage of small animals across the border defined by the fence, comprising:

a strip of flexible sheet material having a width greater than the width of the fence and a length coextensive with the length of the fence and adapted to be arranged on the ground beneath the fence;

said strip including a recess extending along the center longitudinal axis thereof, for receiving said at least one fence panel, and outwardly extending legs extending integrally from said recess symmetrically to lie beyond the opposite sides of the fence panel, for covering areas of the ground on opposite sides of the fence, said legs being [substantially thicker adjacent said recess and gradually thinning at their opposite ends,] *configured* for upwardly biasing said fenceliner when said recess is urged downwardly by the panel of a fence, said biasing providing for facilitated installation under an existing fence, for quick destruction of undesirable vegetation around the fence for inhibiting of the passage of small animals underneath the fence; and a plurality of pad members for receiving the posts, said flexible strip extending over opposite ends of said pad members, said pad members maintaining the continuity of said fenceliner underneath the fence adjacent the posts.

2. A fenceliner as claimed in claim 1 in which said legs are arcuate legs extending downwardly and outwardly from opposite sides of said recess to a point below said recess.

3. A fenceliner as claimed in claim 1 in which said legs are rectilinear legs extending downwardly and outwardly from opposite sides of said recess toward the ground, at an angle of less than 90°, to a point below said recess.

4. A fenceliner as claimed in claim 1 in which said recess comprises a longitudinally extending base portion for engaging the bottom of a fence and opposing longitudinally extending upstanding portions for receiving the panel of a fence and said legs are rectilinear legs extending downwardly and outwardly from opposite sides of said base portion toward the ground at an angle of less than 90° to a point below said recess.

5. In combination with a fence having a plurality of posts in spaced relation to each other, a fenceliner for inhibiting the growth of grass, weeds or like vegetation beneath and closely adjacent to the fence and for inhibiting the passage of small animals across the border defined by the fence, comprising:

a plurality of flexible strip members, each having a width greater than the width of the fence and being arranged on the ground underneath the fence and between adjacent posts of the fence, each of said strip members including a recess extending along the center longitudinal axis thereof receiving a panel of the fence, and legs integrally extending outwardly from said recess beyond the opposite sides of the fence panel, for covering areas of the ground on opposite sides of the fence, each of said legs being [substantially thicker adjacent said recess and gradually thinning at its opposite ends,] *configured* for upwardly biasing said fenceliner when said recess is urged downwardly by the panel of the fence; and a plurality of pad members for receiving the corresponding plurality of posts, said flexible strip members extending over opposite ends of said pad members, said pad [member] *members* maintaining the continuity of said fenceliner underneath the fence adjacent the posts.

6. The fenceliner as claimed in claim 5 in which said legs are arcuate.

7. The fenceliner as claimed in claim 5 in which said legs are rectilinear legs extending from opposite sides of said recess downwardly and outwardly toward the ground at an angle of less than 90°.

8. The fenceliner as claimed in claim 5 in which said recess comprises a longitudinally extending base portion engaging the bottom of the fence and opposing longitudinally extending upstanding portions for receiving the panel of the fence.

*9. A fenceliner as claimed in claim 1 in which said strip legs are substantially thicker adjacent said recess and gradually become thinner at their opposite ends.*

*10. A fenceliner as claimed in claim 5 in which said strip legs are substantially thicker adjacent said recess and gradually become thinner at their opposite ends.*

* * * * *